United States Patent [19]
Chiang

[11] Patent Number: 5,973,622
[45] Date of Patent: Oct. 26, 1999

[54] KEYBOARD WITH A TWO-DIMENSIONAL ACTUATOR FOR GENERATING DIRECTION SIGNALS

[75] Inventor: Tzu-Pang Chiang, Taoyuan, Taiwan

[73] Assignee: Acer Peripherals, Inc., Taoyuan, Taiwan

[21] Appl. No.: 08/928,912

[22] Filed: Sep. 12, 1997

[51] Int. Cl.$^6$ .................................................. H01H 25/00
[52] U.S. Cl. .......................... 341/22; 341/20; 345/168; 345/160; 345/161; 74/471 XY
[58] Field of Search ...................... 341/22, 20; 200/6 A; 345/168, 161, 158, 160, 163, 164, 167; 74/471 XY

[56] References Cited

U.S. PATENT DOCUMENTS

| | | | |
|---|---|---|---|
| 4,575,591 | 3/1986 | Lugaresi | 200/6 A |
| 4,680,577 | 7/1987 | Straayer | 341/22 |
| 5,021,771 | 6/1991 | Lachman | 341/22 |
| 5,521,596 | 5/1996 | Selker | 341/22 |
| 5,694,123 | 12/1997 | Selker | 341/22 |

*Primary Examiner*—Brian Zimmerman
*Assistant Examiner*—Albert K. Wong
*Attorney, Agent, or Firm*—Winston Hsu

[57] ABSTRACT

The present invention relates to a keyboard with a two-dimensional actuator for generating direction signals which can be used to move a cursor shown on a screen to a target position. The keyboard comprises an encoding circuit, a plurality of text keys connected to the encoding circuit each for generating a corresponding text signal, four direction keys connected to the encoding circuit each for generating a corresponding direction signal, and a two-dimensional actuator connected to the encoding circuit which can be actuated at least toward four predefined directions which are the same as the four predefined directions of the four direction keys. When the actuator is actuated toward any of the four predefined directions, the encoding circuit will generate the direction signals which are the same as the direction signals generated by the corresponding direction key.

9 Claims, 2 Drawing Sheets

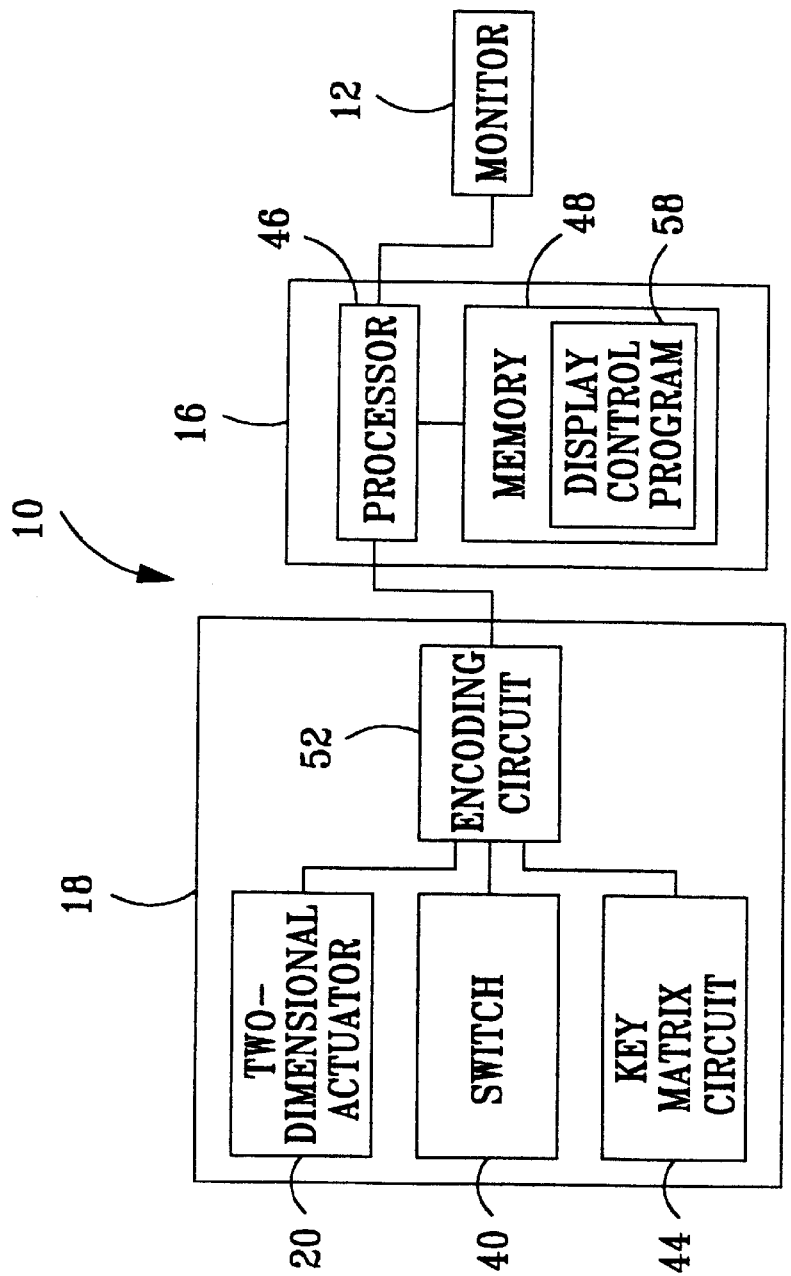

KEYBOARD WITH A TWO-DIMENSIONAL ACTUATOR FOR GENERATING DIRECTION SIGNALS

BACKGROUND OF THE INVENTION

1. Field of the Invention

The present invention relates to a keyboard, and more particularly, to a keyboard with a two-dimensional actuator for generating direction signals which can be used to move a cursor shown on a screen to a target position.

2. Description of the Prior Art

When editing a text file by using a window-based text editing program, such as Microsoft Word for Windows, the cursor which shows where a text character will be inserted on a screen, can be moved to a target position on the screen by using four direction keys: up, down, left, and right keys of a numerical keypad which is usually installed on the right hand side of a keyboard. Besides, a user can also scroll the screen by using the page-up and page-down keys of the numerical keypad to move the cursor to a front page or a rear page, or using the home and end keys to move the cursor to the beginning or ending position of a text line.

Three drawbacks are found about using the keys on the numerical keypad to move the cursor shown on the screen. First, the numerical keypad usually can be set to a numerical-key mode or to a direction-key mode by using a number lock key. A user must make sure that the numerical keypad is set to the direction-key mode before using the direction keys of the numerical keypad to move the cursor. Second, in order to continually enter text characters into a computer, the left and right hands of a user are required to be put over two predetermined positions of a keyboard. But when using the direction keys of a numerical keypad is required to move the cursor, the user must move his or her right hand to the numerical keypad which will cause an interruption over the text input work. Third, if the user is not familiar with each key's position of the numerical keypad, he or she must continuously watch the numerical keypad in order to find the required key before pressing it. Such drawbacks will usually cause inconvenience to the user when using the numerical keypad.

Some keyboards contain a pointing device such as a point sticker, track ball, touch pad, etc., installed approximately at a central position of the keyboard which permits a user to move a pointer shown on a screen by using a thumb or an index finger without moving his or her right hand. However, the signals generated by such a pointing device and the way to use such pointing device are quite different from the four direction keys or the four control keys (page-up, page-down, home and end keys) of the numerical keypad.

The signals generated by such a pointing device are inputted into a computer through a serial port instead of a keyboard port. A separate line is required for connecting the pointing device to the computer for transmitting the signals generated by the pointing device. Besides, the signals generated by such a traditional pointing device are used to move a pointer displayed on a screen instead of moving a cursor or scrolling a screen, like the four direction keys or the four control keys. The signals generated by the four direction keys or the four control keys of the numerical keypad are used by traditional text editing programs to move the cursor or scroll the screen directly. If the pointing device is used to move the cursor to a target position on a screen, the user has to move the pointer to a target position first and then click a left button of the pointing device which will activate the text editing program to relocate the cursor to the target position. When scrolling a screen, the user has to move the pointer to work with a scrolling bar to scroll the screen. Such differences make the pointing device installed at the central position of a keyboard not so easy to reform the functions of the four direction keys and the four control keys of the traditional numerical keypad.

SUMMERY OF THE INVENTION

It is therefore a primary objective of the present invention to provide a keyboard with a two-dimensional actuator to generate the same signals as those generated by the four direction keys or four control keys of a traditional numerical keypad so that the functions of these keys can be performed by actuating the actuator directly.

In a preferred embodiment, the present invention includes a keyboard for converting inputs entered by a user into corresponding signals comprising:

an encoding circuit;

a plurality of text keys connected to the encoding circuit each for generating a corresponding text signal;

four direction keys connected to the encoding circuit each for generating a corresponding direction signal, each of the four direction keys being associated with a predefined direction and the four predefined directions of the four direction keys being perpendicular or opposite to each other; and a two-dimensional actuator connected to the encoding circuit which can be actuated at least toward four predefined directions which are the same as the four predefined directions of the four direction keys;

wherein when the actuator is actuated toward any of the four predefined directions, the encoding circuit will generate the direction signals which are the same as the direction signals generated by the corresponding direction key.

The keyboard further comprises a page-up key and a page-down key separately connected to the encoding circuit for generating corresponding page-up and page-down signals, and a switch connected to the encoding circuit which is installed under the actuator and can be triggered by the actuator when the actuator is being pressed downward, two of the four predefined directions of the actuator being selected for generating the page-up and page-down signals when the switch is triggered by the actuator, wherein when the actuator is actuated toward one of the two selected directions and the switch is also triggered by pressing the actuator downward, the encoding circuit will generate the corresponding page-up or page-down signals. The keyboard further comprises a home key and an end key separately connected to the encoding circuit for generating corresponding home and end signals, and a switch connected to the encoding circuit which is installed under the actuator and can be triggered by the actuator when the actuator is being pressed downward, two of the four predefined directions of the actuator being selected for generating the home and end signals when the switch is triggered by the actuator, wherein when the actuator is actuated toward one of the two selected directions and the switch is also triggered by pressing the actuator downward, the encoding circuit will generate the corresponding home or end signals.

It is an advantage of the present invention that the actuator of the keyboard can be used to generate the same signals as those generated by the four direction keys or four control keys of a traditional numerical keypad so that the functions of these keys can be performed by actuating the actuator directly.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

FIG. 3 is a function block diagram of the computer system shown in FIG. 1.

FIG. 4 is a perspective view of an one-dimensional actuator according to the present invention.

DETAILED DESCRIPTION OF THE PREFERRED EMBODIMENT

Figure 1:
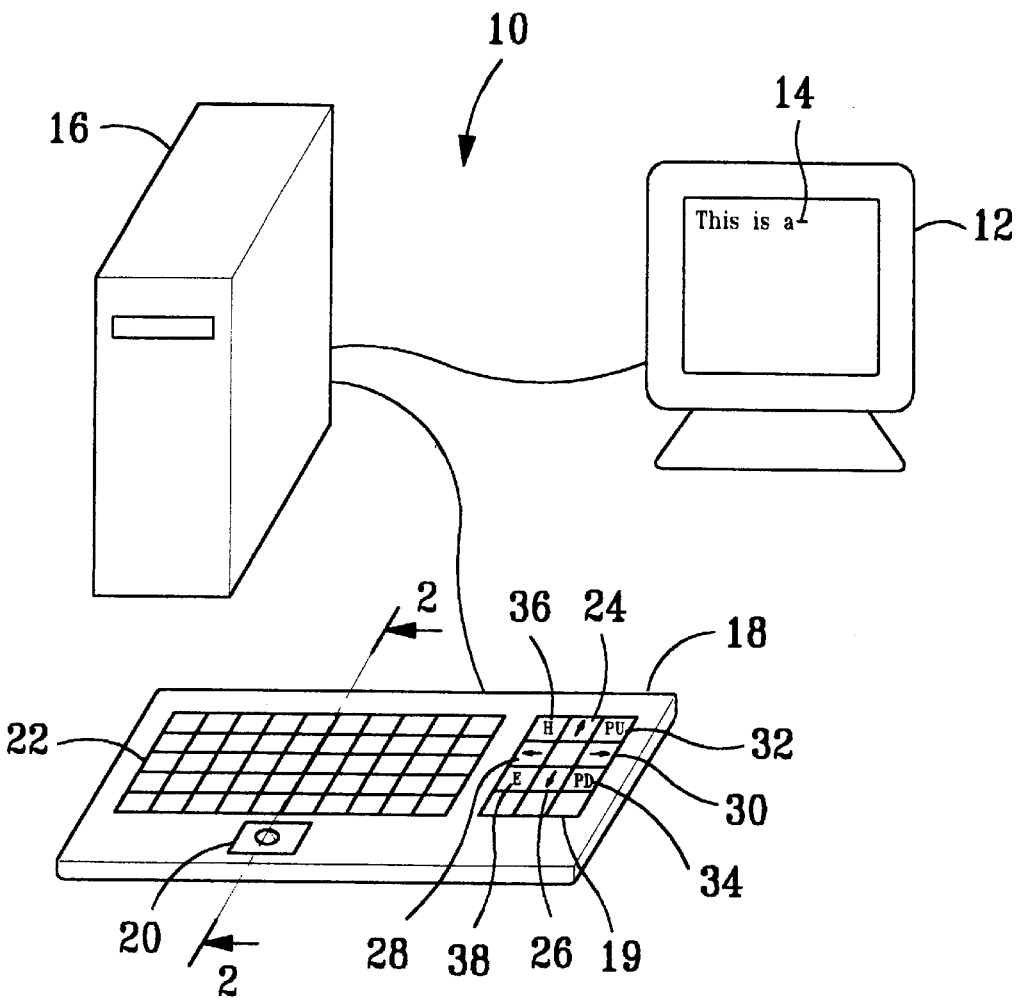
FIG. 1 is a perspective view of a computer system according to the present invention.

Please refer to FIG. 1. FIG. 1 is a perspective view of a computer system 10 according to the present invention. The computer system 10 comprises a monitor 12, a computer16 and a keyboard 18. The monitor 12 shows a cursor 14 over where a text character will be entered. The keyboard 18 comprises a plurality of text keys 22, a two-dimensional actuator 20 installed approximately at a center portion under the text keys 22, and a numerical keypad 19 installed at the right side of the keyboard 18. The actuator 20 is a track ball which can be actuated by using a thumb while the other four fingers can work with the text keys 22 at the same time. The numerical keypad 19 comprises four direction keys 24、26、28、30, and four control keys: page-up key 32、page-down key 34、home key 36 and end key 38.

Figure 2:
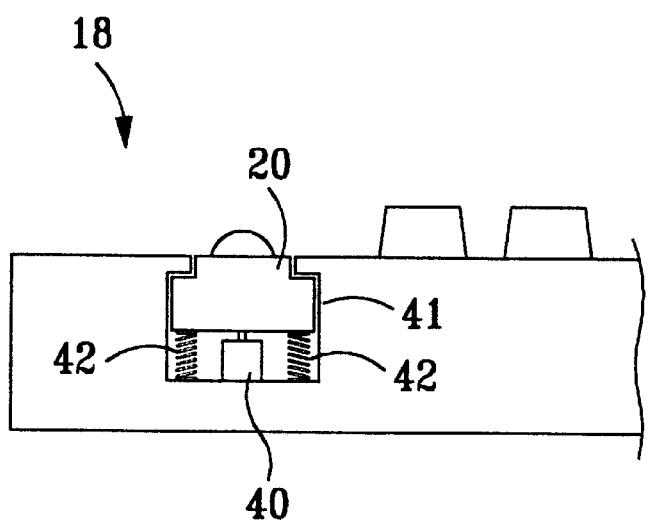
FIG. 2 is a side section view 2—2 of the keyboard shown in FIG. 1.

Please refer FIG. 2. FIG. 2 is a side section view 2—2 of the keyboard 18 shown in FIG. 1. The actuator 20 is a track ball which is elastically installed inside a recess 41 located at the front of the keyboard 18 and can be slightly pressed downward. A switch 40 and several springs 42 are installed inside the recess 41 under the actuator 20 for elastically supporting the actuator 20 upward. The switch 40 can be triggered by pressing the actuator 20 downward. When working with the actuator 20, a user can either interact with the actuator 20 without pressing the actuator 20 downward, or interact with the actuator 20 while pressing the actuator 20 downward at the same time.

Please refer to FIG. 3. FIG. 3 is a function block diagram of the computer system 10 shown in FIG. 1. The computer system 10 comprises a monitor 12 for showing screen, a keyboard 18 for converting inputs entered by a user into corresponding signals, and a computer 16 connected between the monitor 12 and the keyboard 18. The computer 16 comprises a memory 48 for storing programs and data, a display control program 58 stored in the memory 48 for controlling the screen shown on the monitor 12 by the signals generated by the keyboard 18, and a processor 46 for executing the programs stored in the memory 48. The display control program 58 is formed by several commonly used program models (not shown), such as BIOS (basic input output system), window-based operating system, text-editing program executed under the operating system, etc.

The keyboard 18 comprises a two-dimensional actuator 20, a switch 40, a key matrix circuit 44, and an encoding circuit 52 connected to the actuator 20, the switch 40, and the key matrix circuit 44. The key matrix circuit 44 comprises the text keys 22, four direction keys 24、26、28、30, and four control keys: page-up key 32、page-down key 34、home key 36、end key 38 shown in FIG. 1. The text keys 22 connected to the encoding circuit 52 are used for generating text signals. When the encoding circuit 52 detects any of the text keys 22 is being pressed downward, a corresponding text signal will be generated by the encoding circuit 52. The four direction keys 24、26、28、30 connected to the encoding circuit 52 are associated with four predefined directions which are up、down、left and right directions. The four predefined directions are perpendicular or opposite to each other. When any of the four direction keys is being pressed, the encoding circuit 52 will generate a corresponding direction signal. The four control keys: page-up key 32、page-down key 34、home key 36 and end key 38, are used for generating the corresponding page-up、page-down、home and end signals through the encoding circuit 52 when any of the four control keys are being pressed.

The actuator 20 comprises four predefined directions: up、down、left and right, which are the same as the four direction keys 24、26、28、30. The actuator 20 can generate two-dimensional signals when it is being actuated, and the encoding circuit 52 can relate each of the two-dimensional signals to the correspondent predefined direction. The four predefined directions of the actuator 20 associated with the switch 40 can be used to generate the four direction signals of the four direction keys 24、26、28、30 or the four control signals of the four control keys. When the switch 40 is not being pressed by the actuator 20, the four predefined directions of the actuator 20 are used to generate the four direction signals of the four direction keys 24、26、28、30. And when the switch 40 is being pressed by the actuator 20, the four predefined directions of the actuator 20 are used to generate the four control signals of the four control keys: page-up key 32、page-down key 34、home key 36 and end key 38. For example, the up and down directions can be used to generate the page-up and page-down signals of the page-up key 32 and page-down key 34, and the left and right directions can be used to generate the home and end signals of home key 36 and end key 38. In other words, when the actuator 20 is actuated toward any of the four predefined directions, the encoding circuit 52 will convert the two-dimensional signals generated by the actuator 20 into correspondent direction signals or control signals depending on whether the switch 40 is being pressed by the actuator 20 or not.

The ways to convert a two dimensional signal into correspondent direction signal or control signal are different. The two dimensional signals generated by the actuator 20 can be represented by $(\Delta X, \Delta Y)$ where $+X$、$-X$、$+Y$ and $-Y$ represent the predefined right、left、up and down directions. When converting a two-dimensional signal $(\Delta X, \Delta Y)$ into correspondent direction signal(s), the encoding circuit 52 will convert $\Delta X$ and $\Delta Y$ into correspondent direction signals. However, when converting a two-dimensional signal $(\Delta X, \Delta Y)$ into correspondent control signal, only one control signal will be generated each time. For example, it is not permitted generating a page-up signal and a home signal at the same time. The encoding circuit 52 can select one of the two parameters $\Delta X$ and $\Delta Y$ and converts it into correspondent control signals. For example, the encoding circuit 52 can select the parameter which has the largest absolute value.

The direction or control signals generated by the encoding circuit 52 by actuating the actuator 20 and switch 40 are the same as those generated by the direction keys 24、26、28、30 or the four control keys. Compared with the numerical keypad 19, the actuator 20 and switch 40 only change the method of generating these direction or control signals. The display control program 58 stored in the computer 16 can directly process these signals without any modification, and any prior art computer can work with keyboard 18 directly without changing its hardware or software as long as it is equipped with a standard keyboard port.

Please refer to FIG. 4. FIG. 4. shows an alternative one-dimensional actuator 60 of the present invention. The two-dimensional actuator 20 of the keyboard 18 shown in FIGS. 1 and 2 can be replaced by the one-dimensional actuator 60 which is a rotatable wheel and can be rotated toward upward or downward direction. Just like the two dimensional actuator 20, the one-dimensional actuator 60, associated with the switch 40, can be used to generate any two of the four direction signals or control signals. The two directions of the actuator 60 can be associated with any two opposite direction keys of the four direction keys 24、26、28、30, such as the up and down direction keys, to generate correspondent direction signals, or associated with any two opposite control keys of the four control keys 32、34、36、38, such as the page-up key 32 and page-down key 34, to generate correspondent control signals.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A keyboard for converting inputs entered by a user into corresponding signals comprising:

an encoding circuit;

a plurality of text keys connected to the encoding circuit each for generating a corresponding text signal;

four direction keys connected to the encoding circuit each for generating a corresponding direction signal, each of the four direction keys being associated with a predefined direction and the four predefined directions of the four direction keys being different to each other; and a two-dimensional actuator directly and electrically connected to the encoding circuit which can be actuated at least toward four directions which are the same as the four predefined directions of the four direction keys;

wherein when the actuator is actuated toward any of the four directions, the encoding circuit will generate the direction signal which is the same as the direction signal generated by the direction key of the corresponding predefined direction.

2. The keyboard of claim 1 further comprising a page-up key and a page-down key separately connected to the encoding circuit for generating corresponding page-up and page-down signals, and a switch connected to the encoding circuit which is installed under the actuator and can be triggered by the actuator when the actuator is being pressed downward, two of the four predefined directions of the actuator being selected for generating the page-up and page-down signals when the switch is triggered by the actuator, wherein when the actuator is actuated toward one of the two selected directions and the switch is also triggered by pressing the actuator downward, the encoding circuit will generate the corresponding page-up or page-down signals.

3. The keyboard of claim 1 further comprising a home key and an end key separately connected to the encoding circuit for generating corresponding home and end signals, and a switch connected to the encoding circuit which is installed under the actuator and can be triggered by the actuator when the actuator is being pressed downward, two of the four predefined directions of the actuator being selected for generating the home and end signals when the switch is triggered by the actuator, wherein when the actuator is actuated toward one of the two selected directions and the switch is also triggered by pressing the actuator downward, the encoding circuit will generate the corresponding home or end signals.

4. The keyboard of claim 1 wherein the actuator is a track ball which can be rotated at least toward four predefined directions.

5. The keyboard of claim 1 wherein the actuator is installed in the keyboard in a position where the actuator can be actuated by using a thumb and the other four fingers can work with the text keys in the same time.

6. A keyboard for converting inputs entered by a user into corresponding signals comprising:

an encoding circuit;

a plurality of text keys connected to the encoding circuit each for generating a corresponding text signal;

four direction keys connected to the encoding circuit each for generating a corresponding direction signal, each of the four direction keys being associated with a different predefined direction and the four predefined directions of the four direction keys being perpendicular or parallel to each other; and a one-dimensional actuator directly and electrically connected to the encoding circuit which can be actuated toward two opposite directions which are the same as two opposite predefined directions of the four direction keys;

wherein when the actuator is actuated toward any of the two opposite directions, the encoding circuit will generate a direction signal which is the same as the direction signal generated by the direction key of the corresponding predefined direction.

7. The keyboard of claim 6 further comprising a page-up key and a page-down key separately connected to the encoding circuit for generating corresponding page-up and page-down signals, and a switch connected to the encoding circuit which is installed under the actuator and can be triggered by the actuator when the actuator is being pressed downward, the two predefined directions of the actuator being used for generating the page-up and page-down signals when the switch is triggered by the actuator, wherein when the actuator is actuated toward any of the two directions and the switch is also triggered by pressing the actuator downward, the encoding circuit will generate the corresponding page-up or page-down signals.

8. The keyboard of claim 6 wherein the actuator is a wheel which can be rotated toward any of the two opposite directions.

9. The keyboard of claim 6 wherein the actuator is installed in the keyboard in a position where the actuator can be actuated by using a thumb and the other four fingers can work with the text keys at the same time.

* * * * *